F. E. COOK.
Harvester Rake.
No. 65,059.
Patented May 28, 1867.
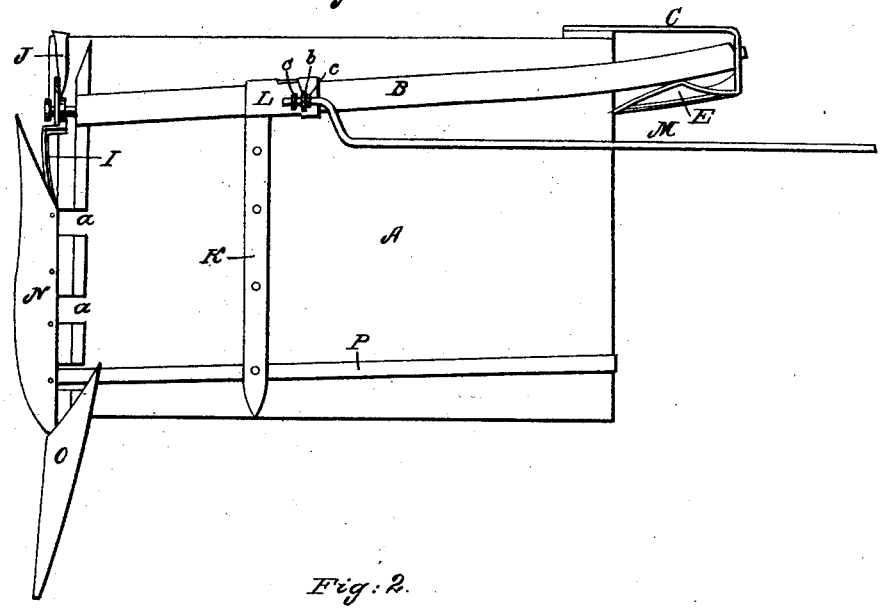
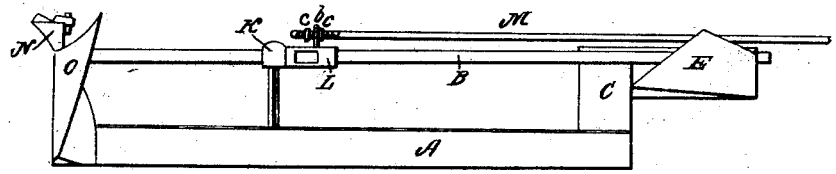
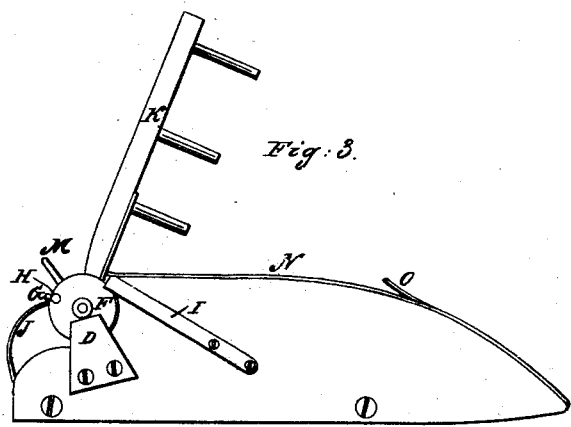
Witnesses:
J. H. Burridge.
W. H. Burridge.
Inventor:
F. E. Cook.

UNITED STATES PATENT OFFICE.

F. E. COOK, OF SEVILLE, OHIO.

IMPROVEMENT IN HARVESTER-RAKES.

Specification forming part of Letters Patent No. 65,059, dated May 28, 1867.

*To all whom it may concern:*

Be it known that I, F. E. COOK, of Seville, in the county of Medina and State of Ohio, have invented certain new and useful Improvements in Harvester-Rakes; and I do hereby declare that the following is a full and complete description of the same, reference being had to the accompanying drawings, making a part of this specification, in which—

Figure 1 is a top view of the rake and platform; Fig. 2, a front view of the same; Fig. 3, a side view.

Like letters of reference refer to like parts in the views presented.

A, Fig. 1, is the platform, upon which the grain falls upon being cut. B is a flat bar extending across the platform, one end being pivoted to the angular arm C, and the other to the standard D, Fig. 3. E is a cam fixed to and supported by the arm C. F is a wheel keyed to the bar referred to. G is a lug, secured to the inner side of the wheel. H is a notch in the edge of the same. I is a spring. The spring I and notch H are for the purpose of holding the bar B and rake in the position shown in Fig. 3, in which position the rake returns to the end of the platform *a a*, and which is raised to said position by the cam E. J is also a spring, the purpose of which will hereinafter be shown. K is the rake, and is attached to the bar by a sleeve, L, and upon which it slides backward and forward by means of the rod M, which is connected to the machine and operated thereby. N is a guard, to prevent the standing grain from bending over onto the platform. O is the divider, and P a strip of iron, upon which a tooth of the rake rests and slides.

The operation of this rake is as follows: The rake, on being drawn to the edge of the platform by the rod M, and the grain thereby dropped upon the ground, is then lifted up by the cam E, over which it slides to the position shown in Fig. 3, and is retained in this position by the spring I, which at this instant catches into the notch in the wheel referred to. In this position the rake returns to the opposite side of the platform, sliding, as above said, upon the bar. On reaching the opposite side, the rake presses against the end of the spring I, which is made to project through the notch, and forces it back and out of it. At the same time the spring J, acting upward against the lug, causes the bar to turn and the rake to fall to the platform, close against the side. The teeth, dropping into the spaces *a a*, fall clear of the grain, so that in raking it takes it clean from the side against which it lies.

It will be observed that the bar is not parallel with the side of the platform, but describes a slight angle with it. This is for the greater convenience of connecting the raking apparatus to the machine.

It will also be seen that the rake is not at right angles with the bar; therefore, should it be drawn straight across in the direction of it, it would not come to the edge of the platform parallel with the edge; hence the grain would not be raked off straight with the end, but would fall off partially endwise and scatter along the ground.

In order to obviate this the bar is curved slightly backward from the cam, and by this means the rake is brought straight with the end, and the grain drops to the ground as required.

It will be seen that the connection of the rod M to the sleeve is such that the end is allowed to play through the lug *b* a certain distance, the collars *c* on the rod being placed apart for that purpose, and which may be more or less, as circumstances may require.

The space between the collars is regulated by one of them being provided with a screw, which, by this means, can be screwed close to or away from the rigid one, and thus making the distance more or less, as may be required.

The purpose of this freedom of the rod is to give the rake time to fall into its place when returned to the end of the platform before the reaction of the rod. It also allows a little time for the grain to accumulate to make a full gavel before being raked off.

What I claim as my invention, and desire to secure by Letters Patent, is—

1. The pivoted curved bar B, sleeve L, and rake K, in combination with the rod M and cam E, as and for the purpose set forth.

2. The notched wheel F, springs I and J, in combination with the bar B and rake, as and for the purpose described.

3. The nut and screw with lug, in combination with the sleeve L and bar B, so as to allow the rake to fall back in place in the spaces *a* before it is drawn across the platform in discharging the gavel, as and for the purpose specified.

F. E. COOK.

Witnesses:
W. H. BURRIDGE,
J. H. BURRIDGE.